United States Patent
Marcos Primo et al.

(10) Patent No.: US 9,481,230 B2
(45) Date of Patent: Nov. 1, 2016

(54) SUNVISOR FOR VEHICLES

(71) Applicant: GRUPO ANTOLIN-INGENIERIA, S.A, Burgos (ES)

(72) Inventors: Ignacio Marcos Primo, Burgos (ES); Vincent Bernard, Rupt-sur-Moselles (FR)

(73) Assignee: GRUPO ANTOLIN-INGENIERIA, S.A, Burgos (ES)

( * ) Notice: Subject to any disclaimer, the term of this patent is extended or adjusted under 35 U.S.C. 154(b) by 325 days.

(21) Appl. No.: 14/301,483

(22) Filed: Jun. 11, 2014

(65) Prior Publication Data

US 2014/0362595 A1 Dec. 11, 2014

(30) Foreign Application Priority Data

Jun. 11, 2013 (EP) .................................. 13382222

(51) Int. Cl.
*B60Q 1/00* (2006.01)
*B60J 3/02* (2006.01)

(52) U.S. Cl.
CPC ............. *B60J 3/0226* (2013.01); *B60J 3/023* (2013.01); *B60J 3/0265* (2013.01); *B60J 3/0282* (2013.01)

(58) Field of Classification Search
CPC ...... B60J 3/0226; B60J 3/023; B60J 3/0265; B60J 3/0282; B60J 3/0221; B60J 3/0217; Y10T 29/4984; Y10T 29/49876
USPC .................. 362/492; 296/97.11, 97.13, 97.9; 248/289.11, 292.13, 80.2
See application file for complete search history.

(56) References Cited

U.S. PATENT DOCUMENTS

| | | | | |
|---|---|---|---|---|
| 4,377,020 A * | 3/1983 | Vigo | ..................... | B60J 3/0217 16/329 |
| 5,139,303 A * | 8/1992 | Miller | ................... | B60J 3/0265 296/97.12 |
| 5,564,772 A * | 10/1996 | Miller | ................... | B60J 3/0265 16/297 |
| 6,595,571 B1 * | 7/2003 | Krebs | ................... | B60J 3/0217 248/289.11 |
| 8,764,093 B2 * | 7/2014 | Welter | ................... | B60J 3/023 296/97.9 |
| 2002/0175535 A1 * | 11/2002 | Beaver | ................. | B60J 3/0221 296/97.9 |

* cited by examiner

*Primary Examiner* — Peggy Neils
*Assistant Examiner* — Tsion Tumebo
(74) *Attorney, Agent, or Firm* — Cantor Colburn LLP

(57) ABSTRACT

A sunvisor with for a vehicle, including a sunvisor body having a front surface and a rear surface, a hinging arrangement for hinging the sunvisor body to a roof structure of a vehicle body, the hinging arrangement including a hook member located above an upper side portion of the sunvisor body, an upper rod unrotatably connected to the sunvisor body, a detent member rotatably coupled to a lateral end portion of the upper rod outside the sunvisor body and to the roof structure and includes pivot means to swing the sunvisor body between a first screening position and a second screening position.

12 Claims, 9 Drawing Sheets

SUNVISOR FOR VEHICLES

TECHNICAL FIELD

The present invention relates to interior tiltable sunvisors for vehicles such as cars, lorries, vans and buses, and is especially useful for an interior tiltable sunvisor with an illuminable vanity mirror which may swing between a first screening position where it faces a windshield of the vehicle, and a second screening position, where it faces a side window of the vehicle.

BACKGROUND

Sunvisors are devices used in vehicles to provide front window and, in some cases, side window screening against sunlight Such sunvisors are pivotal about a longitudinal axis between an inoperative position where it is folded towards the headliner and at least a first screening position where the sunvisor is deployed such that it extends angularly from the headliner and its front surface faces the windshield. Most sunvisors can also be unlocked from a roof structure mounted clip or D-ring and pivoted to the side window about a support arm attached to the vehicle roof structure. A biasing means such as a detent member is typically mounted within the visor body to prevent movement and noise when the sunvisor is in the inoperative position.

Over the years, a number enhancements or features have been included in sunvisors to increase their versatility as well as to add other convenience factors to the vehicle occupants. A common feature is a vanity mirror with or without a cover (pivotal or sliding) and with or without an illumination means which is mounted in a rear surface of the sunvisor, typically the surface facing the headliner when the sunvisor is in the inoperative position. The sunvisor need only be pivoted to the first screening position to allow use of the mirror. Another feature is the telescopic extension of the entire sunvisor along the longitudinal axis of the support arm to enable the sunvisor to be repositioned laterally across the windshield or the side window to block sun light entry in a particular direction for an occupant of the vehicle.

A typical sunvisor for a vehicle, comprises a sunvisor body comprising a front surface and a rear surface; a hinging arrangement for hinging the sunvisor body to a roof structure of a vehicle such that the sunvisor body is tiltable about an upper horizontal axis between a at least a first screening position where said front surface faces an upper portion of the windshield and an inoperative position where said sunvisor body is upwardly folded and the rear surface thereof is facing the headliner, the hinging arrangement comprising a hook member or check retainer in which a rod-shaped lateral extension of the sunvisor body can be detachably engaged, an upper rod unrotatably connected to the sunvisor body and comprising a lateral end portion that laterally protrudes from a side portion of the sunvisor body which is opposite to said rod-shaped lateral extension; a detent member rotatably coupled to the upper rod and designed to selectively retain the sunvisor body in said first screening and in said inoperative positions; and pivot means connected to the lateral end portion of the upper rod and fastened to the roof structure to swing the sunvisor body against a resistance exerted against pivoting by a braking arrangement, between the first screening position where the sunvisor body is hooked in the hook member to a second screening position where the rear surface of the sunvisor body is adjacent to an upper portion of a side window. The detent member is arranged inside the sunvisor body.

At present, there is a tendency according to which sunvisor bodies must be made as thin as possible to increase the upper free space what is an increasingly critical design demand for vehicles.

Thus, car manufacturers more and more require sunvisor bodies to have a thickness of 15 mm or less instead of the usual 20 mm thickness. A standard detent member has a thickness of up to 12 mm, a standard vanity pack i.e. the vanity mirror, the cover, the illumination means, the electric connections may have a whole thickness of 10-12 mm when integrating the fixing interfaces, and a standard cover has a thickness of up to 2 mm per side. Thus, it is rather difficult to achieve a thickness of less than 15 mm for a sunvisor body using standard components only in a standard structure, moreover when the sunvisor is to comprise the vanity pack and/or other functionalities.

DE-10025743-A1 and GB-2278327-A1 disclose different prior art systems. For example, DE-10025743-A1 discloses a sunvisor body comprising a front surface and a rear surface and a hinging arrangement for hinging the sunvisor body to a roof structure, such that the sunvisor body is tiltable about an upper horizontal axis between a first screening position where said front surface faces an upper portion of a windshield and an inoperative position where said rear surface is upwardly folded to face the roof structure. An upper rod is unrotatably connected to the sunvisor body and comprises a lateral end portion that laterally protrudes from a side portion of the sunvisor body which is opposite to said rod-shaped lateral extension, and a detent member rotatably coupled to the upper rod and designed to selectively retain the sunvisor body in at least said first screening position and in said inoperative position. Pivot means are connected to the lateral end portion of the upper rod and fastened to the roof structure to swing the sunvisor body between the first screening position to a second screening position where the rear surface of the sunvisor body is adjacent to an upper portion of a side window. The detent member is coupled to the lateral end portion of the rod and located outside the sunvisor body, and the pivot means are integrated in the detent member.

BRIEF SUMMARY

The present invention is intended to overcome the above described drawbacks by means of a sunvisor for a vehicle, comprising a sunvisor body comprising a front surface and a rear surface;

a hinging arrangement for hinging the sunvisor body to a roof structure of a vehicle body such that the sunvisor body is tiltable about an upper horizontal axis between a first screening position where said front surface faces an upper portion of a windshield and an inoperative position where said rear surface is upwardly folded to face the roof structure, the hinging arrangement comprising a hook member in which a rod-shaped lateral extension of the sunvisor body can be detachably engaged when the sunvisor is in the first screening position and in said inoperative position, an upper rod unrotatably connected to the sunvisor body and comprising a lateral end portion that laterally protrudes from a side portion of the sunvisor body which is opposite to said rod-shaped lateral extension, and a detent member rotatably coupled to the upper rod and designed to selectively retain the sunvisor body in at least said inoperative position and in said first screening position;

pivot means connected to the lateral end portion of the upper rod and fastened to the roof structure to swing the sunvisor body against a resistance exerted against pivoting by a braking arrangement, between the first screening position where the sunvisor body is hooked in the hook member to a second screening position where a rear portion of the sunvisor body is adjacent to an upper portion of a side window;

wherein the detent member is coupled to the lateral end portion of the rod and located outside the sunvisor body, and the pivot means are integrated in the detent member.

The lateral end portion of the rod comprises an engagement portion, and the detent member comprises a detent clip comprising an enveloping portion and two wing portions emerging from the enveloping portion, and a housing with an inner hollow for accommodating the detent clip.

The enveloping portion tightly embraces a peripheral portion of the engagement portion, whilst the housing is pivotally coupled to a foot member that is fixedly fastenable to the roof structure. The housing comprises two axially-opposed throughholes for rotatably bearing the engagement portion. Retaining means are provided at the housing to couple the wing portions of the detent clip.

The retaining means may comprise a central crossbar arranged within an upper portion of the inner hollow of the housing above and parallel to the lateral end portion of the rod and locking elements for locking upper portions of the wing portions to the crossbar.

According to this embodiment, the engagement portion and the enveloping portion are rotatably coupled to each other in such a manner that a friction torque is opposed against rotation of the rod when the sunvisor body is tilted between said screening and said inoperative positions.

The lateral end portion of the rod may have a cylindrical shape and comprise a free end. The engagement portion may comprise a recessed flat area. The engagement portion may be overmolded with a sleeve member of a technical plastic material having an elevate toughness. This sleeve member comprises a further recessed flat area located over at least a portion of the recessed flat area on the lateral end portion of the rod, so that the enveloping portion of the clip thus tightly embraces the peripheral portion of the engagement portion via the sleeve member.

The foot member comprises a base plate with a circular opening and a cylindrical upper body portion comprising a cylindrical hollow which is aligned with the circular opening to form a cylindrical passage. In this case, at least an upper portion of the housing has a cylindrical shape dimensioned to fit snugly and pivotally within said cylindrical passage, and the housing comprises an upper base provided with at least two clipping members which are slidably retained on an upper rim portion of the cylindrical upper body portion of the foot member, whilst the braking arrangement comprises a spiral spring member with two edges tightly fixed to the foot member and wound around a peripheral portion of the cylindrical upper body portion of the foot member, such that a friction torque between the detent member and the spiral spring member must be overcome to pivot the sunvisor body from said first screening position to said second screening position.

In a preferred embodiment of the invention, the sunvisor also comprises a vanity mirror mounted behind said rear surface of the sunvisor body, the rear surface comprising an opening through which the vanity mirror is at least partially visible, and a cover mounted to the sunvisor body, the cover being movable between a closed position where it covers said opening in the rear surface of the sunvisor body and an opened position where it does not cover said opening. An illumination system comprising at least one lighting member, that for example may be selected from incandescent bulbs and LED devices, and arranged within the sunvisor body, is included to provide illumination to the vanity mirror. The illumination system is connected to a power output of the vehicle by means of an electric connection arrangement which comprises switching means comprising an actuator member and designed to switch off electric power supply to the illumination system at least when said cover is in its closed position, and a first electric output contact and a second electric output contact integrated in the hook member, a first electric input contact and a second electric input contact located both on said rod shaped lateral extension such that, when the rod shaped lateral extension is held by said hook member, said output contacts respectively contact said input contacts to provide the electric power supply to the illumination system.

A transparent light diffusing member may be fixed between the vanity mirror and the lighting member.

The sunvisor body may be connected to the upper rod such that, at least when the rod-shaped lateral extension is unhooked from the hook member, it is axially slidable on the upper rod between a nearer position where the sunvisor body is closer to the detent member and a farther position where the sunvisor body is most distanced from the detent member. This function is sometimes called as "Slip-On-Rod Function" and allows displacing the sunvisor body between said nearer and farther positions when the sunvisor is in its second screening position such that the occupant of the vehicle may move the sunvisor body along the side window.

The electric connection arrangement may comprise a first connection path that connects the first input contact and the lighting member, and a second connection path that connects the second input contact with the lighting member. In this case, the switching means are operatively interconnected in at least one of the connections paths between the input contact and the lighting member.

Pursuant to an embodiment of the invention, the sunvisor body may comprise an inner support board, and the rear surface of the sunvisor body may be a rear portion of a rear shell affixed to the support board. The front surface of the sunvisor body may be a front portion of a front shell, such that the support board is sandwiched between the rear shell and the front shell. Preferably, the rod-shaped lateral extension protrudes laterally from the support board, in which case the lateral extension may be a frame-like portion comprised of two horizontal arms the upper of which is the rod-shaped lateral extension, and which are connected to each other by means of a connecting arm. The vanity mirror and the connections paths may be affixed to rear side portions of the support board. According to this embodiment the cover may be a lid hinged to the sunvisor body, and the sunvisor body is connected to the upper rod by this support board. The lid may be hinged to the rear shell. The lid may as well be a sliding lid with the same functions, opening and closing the electric circuit when sliding between its open and its closed positions.

Preferably, at least one connection path may comprise an input path section having one end portion connected to the second input contact and an opposite free end portion, and a second input path section having an end portion connected to the lighting member and an opposite free end portion. One free end portion is a fixed contact and the other free end portion is a moving contact such as for example an elastically flexible blade portion that overlaps the other free end portion at a distance when the cover is the closed position, whilst the actuator member is an actuating portion of the cover designed to push the moving contact against the fixed contact when the cover is opened. The actuating portion may be a rim portion of the lid hinged to the sunvisor body in such a manner that the rim portion is pressed against the flexible blade portion plate when the cover is opened. One or, preferably, each of the connections paths, is at least partially, and preferably completely comprised of an electrical blade or track affixed to the support board.

The hook member may be comprised of a main body which is fastenable to the roof structure of the vehicle body and a hook portion for holding the rod shaped lateral extension of the sunvisor body. In this case, the electric input contacts are metal strips, and the output contacts are mounted to the main body such that they contact the metal strips when the rod-shaped lateral extension of the sunvisor body is held in the hook member. The output contacts may be mounted to the main body in a resiliently retractile manner, for example with the aid of compressible spring members.

As apparent, the present invention provides a structure allowing a very thin sunvisor body even when high range functions and elements such as frontal and lateral screening, a flipping lid, an illuminated vanity mirror and the above described Slip-On-Rod Function are integrated into the sunvisor without increasing the thickness of the sunvisor.

The interface with the roof structure and headliner is basically the same as that of already existing sunvisors, to that the present invention is easily implementable in present vehicle manufacturing plants.

The term "comprises" and its derivations (such as "comprising", etc.) as used herein should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

Figure 1:
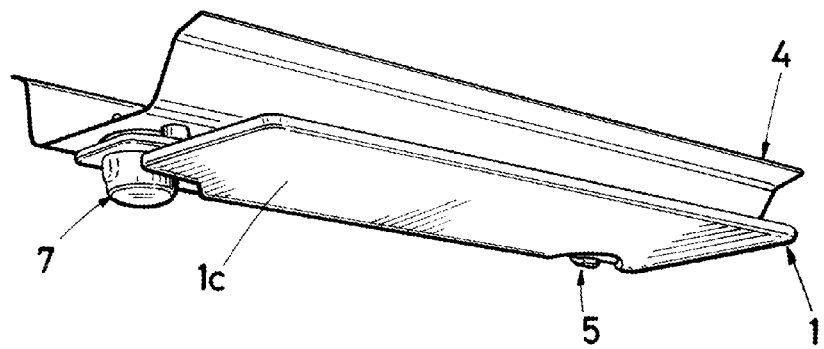
FIG. 1 is a rear perspective view of an embodiment of a sunvisor in its inoperative position.
Figure 2:
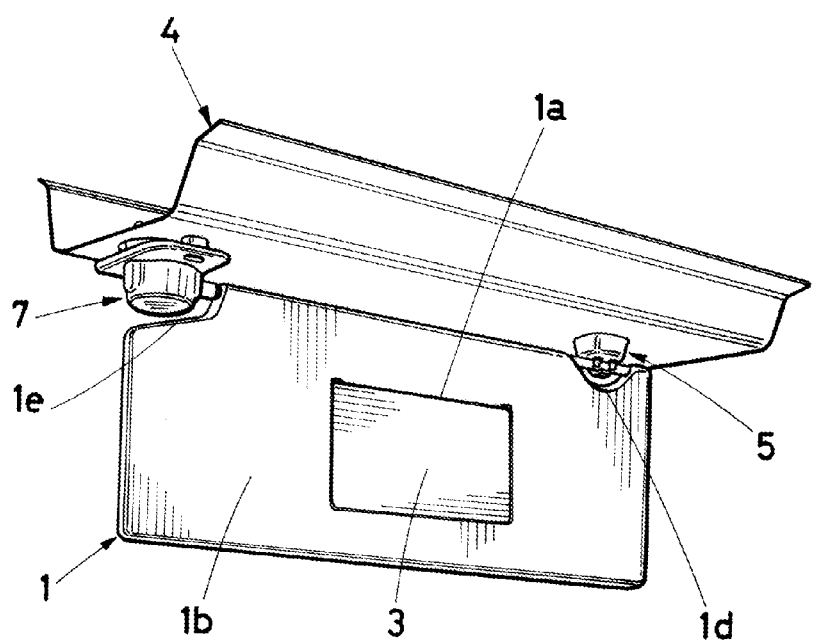
FIG. 2 is a rear perspective view of the sunvisor shown in FIG. 1 tilted to its operative first screening position to face a windshield of a car.
Figure 3:
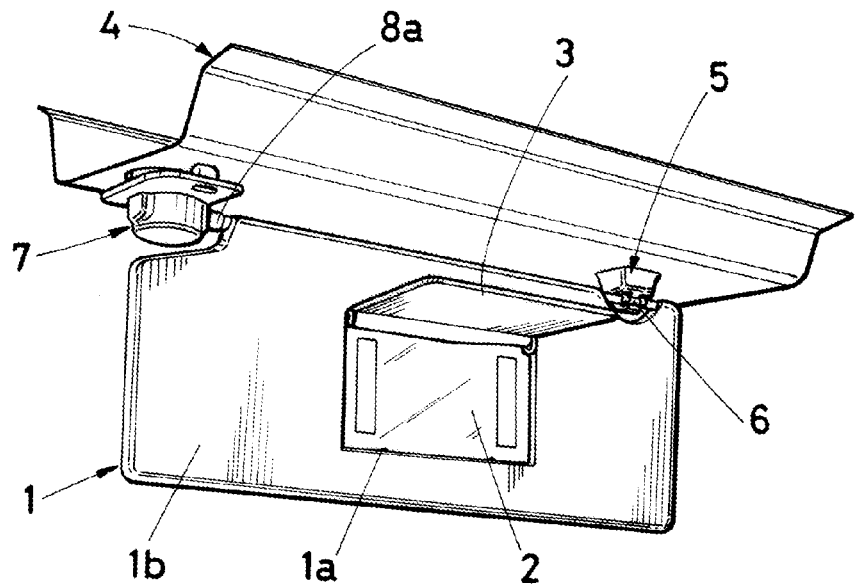
FIG. 3 is a rear perspective view of the sunvisor shown in FIG. 2 with its lid of the mirror opened.
Figure 4:
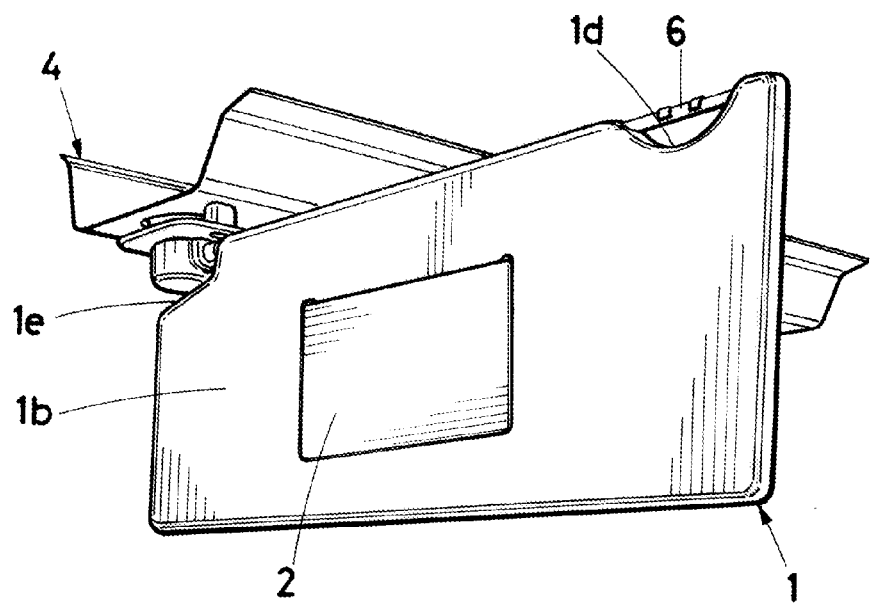
FIG. 4 is a rear perspective view of the sunvisor shown in FIG. 2 swung to its second screening position to face a side or lateral window of the car, and where the sunvisor body is closest to the detent member.
Figure 5:
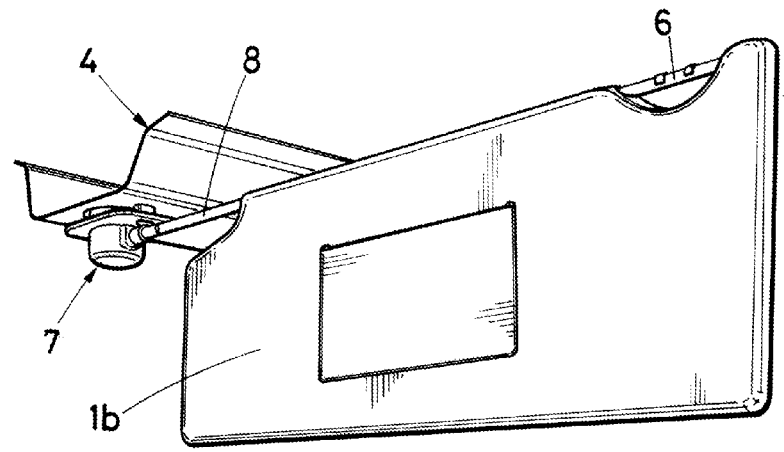
FIG. 5 is a rear perspective view of the sunvisor shown in FIG. 2 in the second screening position and where the sunvisor body is most distanced from the detent member (Slip on Rod).

These figures include reference numerals that refer to the following elements:
1 sunvisor body
1a opening
1b rear shell
1c front shell
1d first recess
1e second recess
2 vanity mirror
3 cover
4 roof structure
5 hook member
5a main body
5b hook portion
6 rod-shaped lateral extension
7 detent member
7a detent clip
7b enveloping portion
7c wing portions
7d housing
7e inner hollow
7f axially-opposed throughholes
7g foot member
7h lateral window
7i sleeve member
7j further recessed flat area
7k base plate
7l circular opening
7m cylindrical upper body portion
7n cap 7o clipping members
7p upper rim portion
7q spiral spring member
7r central crossbar
7s locking elements
8 upper rod
8a lateral end portion
8b engagement portion
8c recessed flat area
8d free end
9a lighting member
9b transparent light diffusing member
10 actuator member
11a first electric output contact
11b second electric output contact
11c first electric input contact
11d second electric input contact
11e first connection path
11f second connection path
11g input path section
11h free end portion
11i second input path section
11j free end portion
12 inner support board
12a frame structure
12b, 12b' sliding guide
12c first arm member
12d second arm member
12e connection arm
12f apertures
12g snap member
13 spiral spring

DETAILED DESCRIPTION

FIGS. 1-5 show an embodiment of the sunvisor in accordance with the present invention in various positions.

As apparent, the sunvisor comprises a sunvisor body -1- comprising a front surface and a rear surface, a hinging arrangement for hinging the sunvisor body -1- to a roof structure -4- of a vehicle body (not shown), such that the sunvisor body -1- can be tilted about an upper horizontal axis between a first screening position (FIG. 2) where the front surface faces an upper portion of a front window, and an inoperative position (FIG. 1) where the rear surface is upwardly folded to face the roof structure -4-, a detent member -7- that includes pivot means, a vanity mirror -2- mounted behind the rear surface of the sunvisor body -1-, and a cover -3-, particularly a lid hinged to the sunvisor body -1-. The rear surface of the sunvisor body comprises an opening -1a- through which the vanity mirror -2- is partially visible, and the lid -3- is movable between a closed position (FIG. 2) where it covers the mirror 2 of the sunvisor body -1- and an opened position (FIG. 3) where it does not cover the mirror 2. The rear surface of the sunvisor body -1- is a rear portion of a rear shell -1b- and the front surface of the visor body -1- is a front portion of a front shell -1c-. The hinging arrangement comprises a hook member -5- and the detent member -7-.

The hook member -5- is located above a first recess -1d- of an upper side portion of the sunvisor body -1- and in which a rod-shaped lateral extension -6- of the sunvisor body -1- is detachably engaged, an upper rod -8- unrotatably connected to the sunvisor body -1- and comprising a lateral end portion -8a- that laterally protrudes from a side portion of the sunvisor body -1- which is opposite to said rod shaped lateral extension -6-.

The detent member -7- is rotatably coupled to a lateral end portion -8a- of the rod -8- and located outside the sunvisor body -1- above a second recess -1e- thereof, and the pivot means integrated in the detent member -7-, allow the sunvisor body to swing the against a resistance exerted against pivoting by a braking arrangement, between the first screening position (FIG. 2) where the sunvisor body -1- is hooked in the hook member -5- to a second screening position (FIG. 4) where a rear portion of the sunvisor body -1- is adjacent to an upper portion of a side window;

The sunvisor body -1- is connected to the upper rod -8- such that, at least when the lateral extension -6- is unhooked from the hook member -5- it is axially slidable on the upper rod -8- between a nearest position (FIG. 4) where the sunvisor body -1- is closest to the detent member -7- and a farthest position (FIG. 5) where the sunvisor body -1- is most distanced from the detent member -7-. As mentioned above, this sliding function is known as "Slip-On-Rod Function" which allows the occupant of the vehicle to move the sunvisor body along the side window.

FIGS. 9 to 16 show an embodiment of the detent member -7- that includes the pivot means, according to which the detent member -7- comprises a detent clip -7a- comprising en enveloping portion -7b- and two wing portions -7c- emerging from the enveloping portion -7b-, and a cylindrical housing -7d- with an inner hollow -7e- for accommodating the detent clip -7a-.

The pivot means comprise the housing -7d- and a foot member -7g- to which the housing is pivotally coupled: The foot member -7g-t is fixedly fastenable to the roof structure -4- and the housing -7d- comprises two axially-opposed throughholes -7f- for rotatably bearing the engagement portion -8b-, and retaining means to which the wing portions -7c- of the detent clip -7a- are coupled. The upper wall portion of the housing -7d- is provided with diametrically opposed lateral windows -7h-

The enveloping portion -7b- tightly embraces a peripheral portion of an engagement portion -8b- comprised at the lateral end portion -8a- of the rod -8-, and engagement portion -8b- and the enveloping portion -7b- are rotatably coupled to each other in such a manner that a friction torque is opposed against rotation of the rod -8- when the sunvisor body is tilted between the operative and the inoperative positions. In the embodiment shown this is particularly achieved in the following manner:

The lateral end portion -8a- of the rod -8- has a cylindrical shape and comprises a free end -8d- and the engagement portion -8b- comprises a recessed flat area -8c-, and may be overmolded with a sleeve member -7i- of a technical plastic material having an elevate toughness. The sleeve member -7i- comprises a further recessed flat area -7j- located over at least a portion of the recessed flat area -8c- on the lateral end portion of the rod -8-, such that the enveloping portion -7b- of the detent clip -7a- tightly embraces the peripheral portion of the engagement portion -8b- via the sleeve member -7i-.

The retaining means to which the wing portions -7c- of the detent clip -7a- are coupled, comprise a central crossbar -7r- arranged within an upper portion of the inner hollow -7e- of the housing -7d- above and parallel to the lateral end portion -8a- of the rod -8-, and locking elements -7s- for locking upper portions of the wing portions -7c- to the crossbar -7r-. The above mentioned lateral windows -7h- provide access for locking the upper portions of the wing portions -7c- to the crossbar -7r-.

Figure 15:
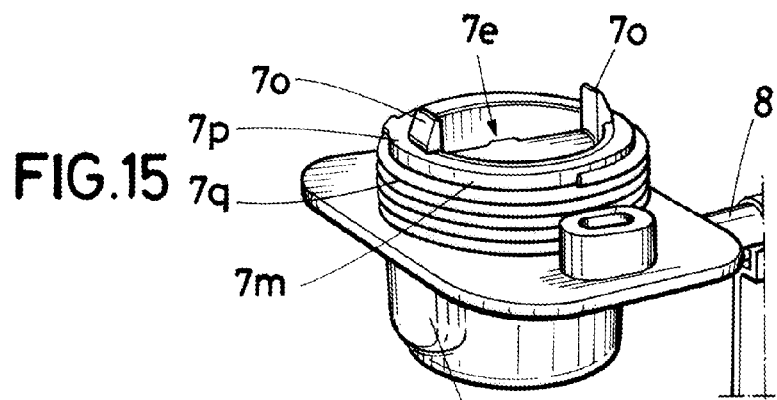
FIG. 15 is a top perspective view of the arrangement shown in FIG. 14 where the lower portion of the cylindrical housing is protected by a cap.
Figure 16:
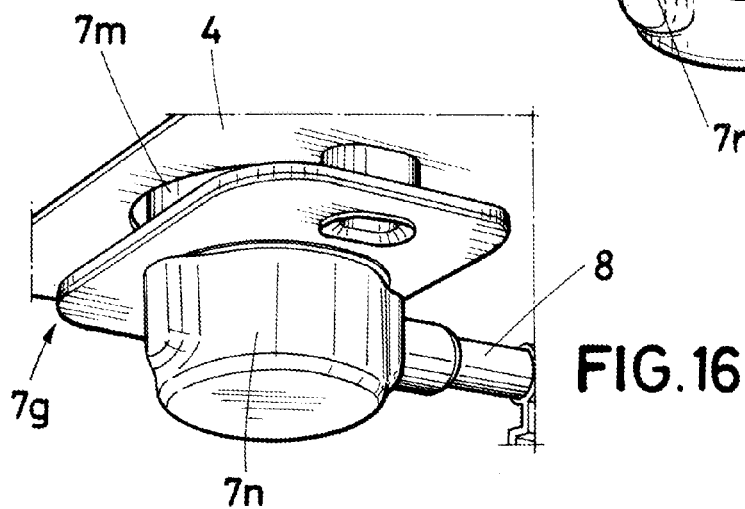
FIG. 16 is a bottom perspective view of the arrangement shown in FIG. 15.

The foot member -7g- comprises a base plate -7k- with a circular opening -7l- and a cylindrical upper body portion -7m- comprising a cylindrical hollow which is aligned with the circular opening -7l- to form a cylindrical passage. The upper portion of the cylindrical housing -7d- is dimensioned to fit snugly and pivotally within the cylindrical passage. The upper base of the housing -7d- is provided with two diametrically opposed clipping members -7o- which are slidably retained on an upper rim portion -7p- of the cylindrical upper body portion -7m- of the foot member -7g-. The lower portion of the housing -7- is protected by a cup-shaped cap -7n- (FIGS. 15, 16).

The braking arrangement providing the resistance exerted against pivoting comprises a spiral spring member -7q- with two edges tightly fixed to the foot member -7g- and wound around a peripheral portion of the cylindrical upper body portion -7m- of the foot member -7g-, such that a friction torque between the detent member and the spiral spring member must be overcome to pivot the sunvisor body -1- from the first screening position to the second screening position.

Figure 6:
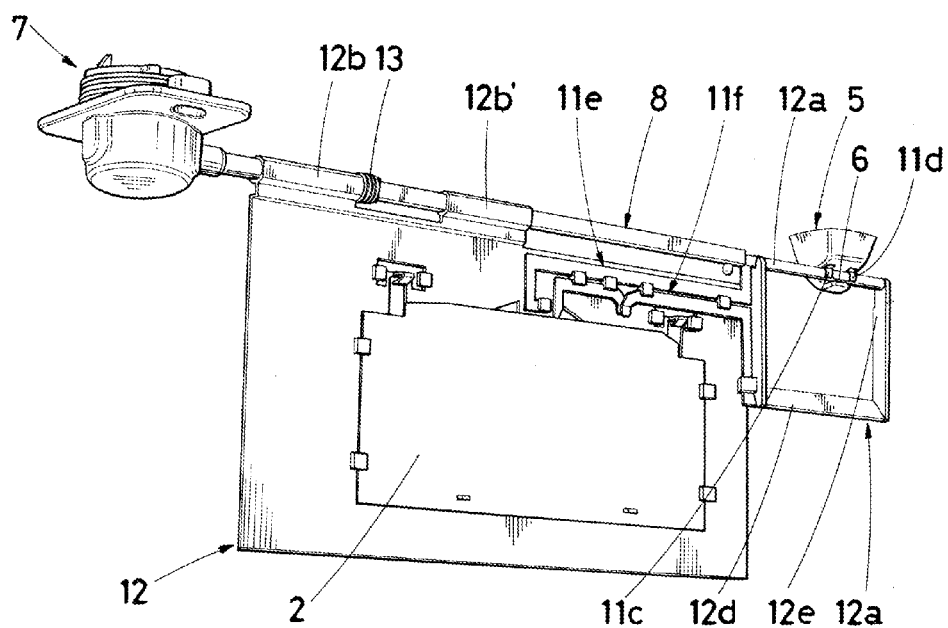
FIG. 6 is a rear perspective view of an embodiment of a support board and the connections thereof to the hook member and the detent member.
Figure 7:
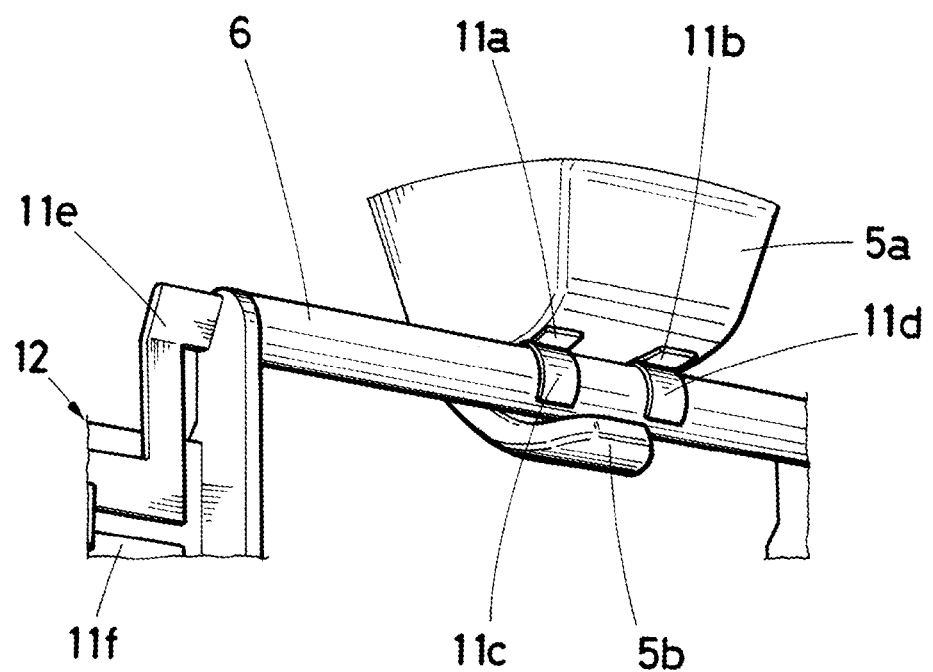
FIG. 7 is a rear perspective view of the hook member shown in FIG. 6.
Figure 8:
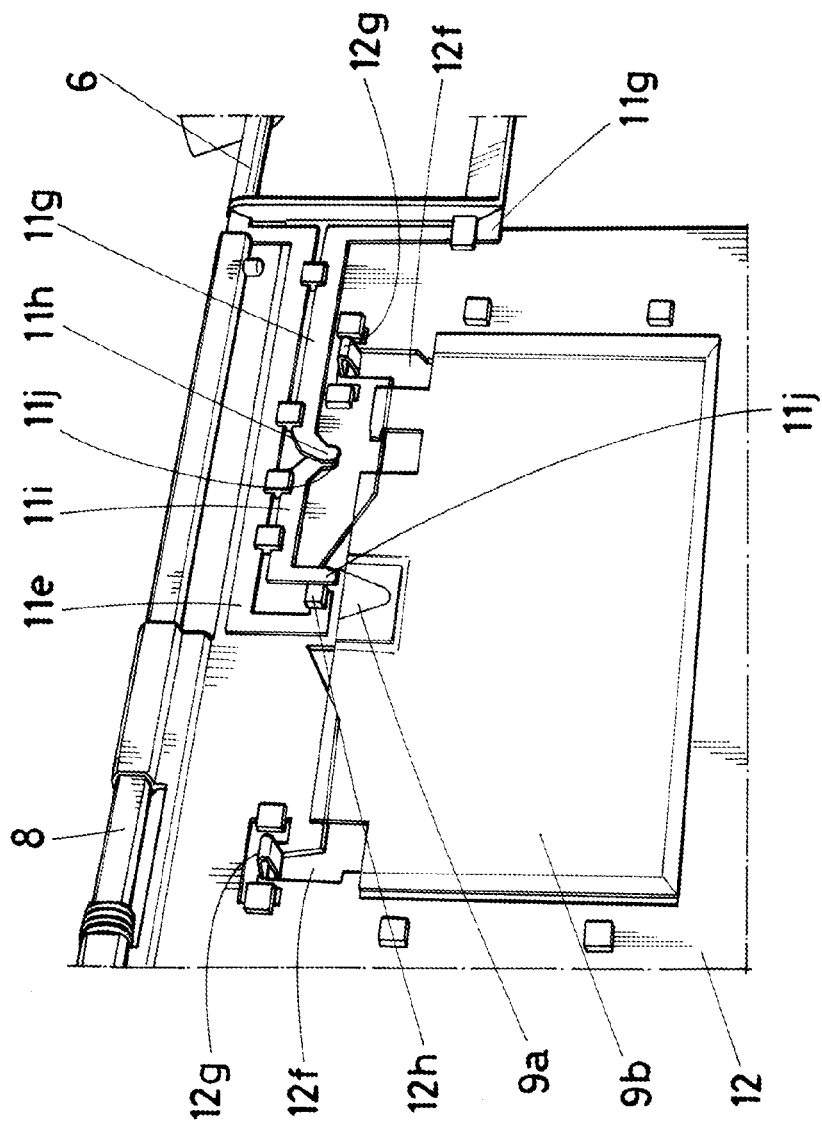
FIG. 8 is an enlarged partial rear perspective view of the support board shown in FIG. 6.
Figure 9:
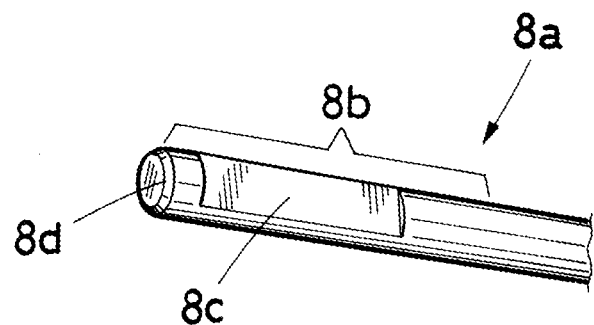
FIG. 9 is a rear perspective view of an embodiment of a lateral end portion of the rod for connection of the sunvisor body to the detent member.
Figure 10:
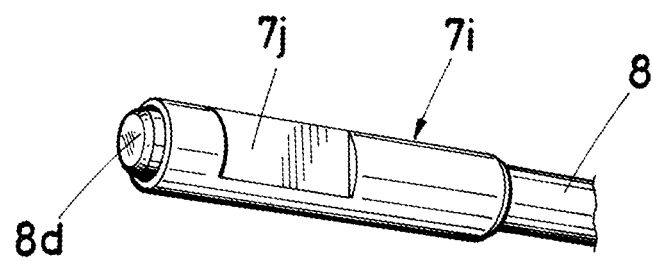
FIG. 10 shows the lateral end portion of FIG. 10 partially overmolded with a sleeve member of technical plastic.
Figure 11:
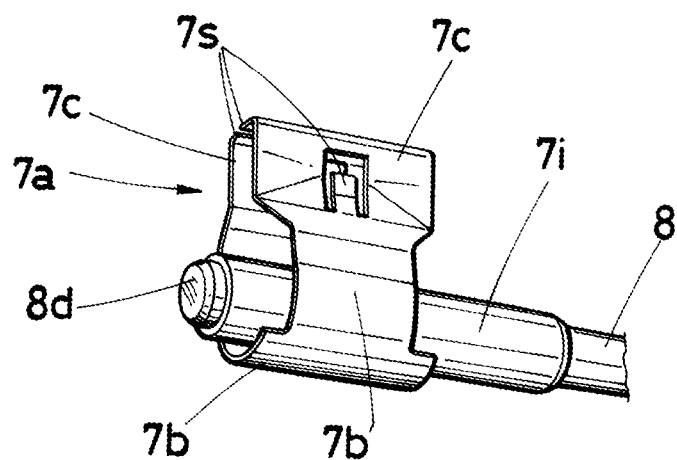
FIG. 11 shows the sleeve member overmolded over the lateral end portion of FIG. 9 and a thereon placed detent clip.
Figure 12:
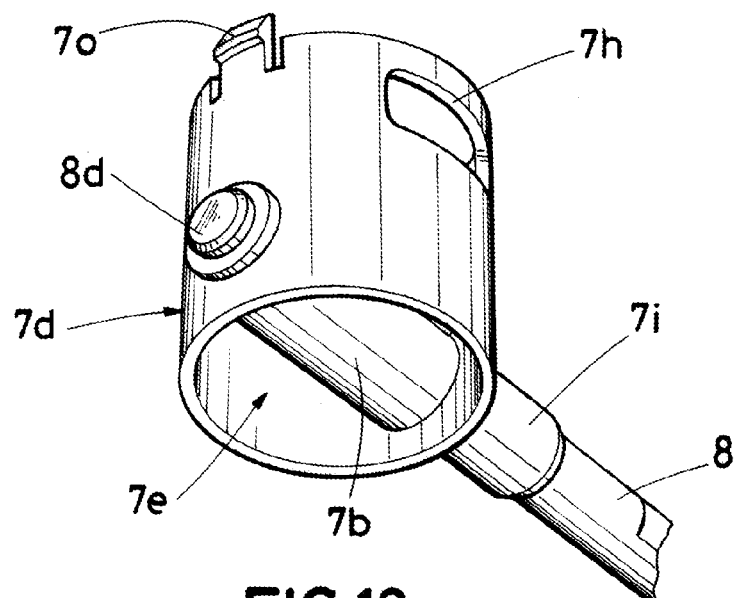
FIG. 12 is a bottom perspective view showing a cylindrical housing in which the lateral end portion overmolded with the sleeve member, and the detent clip of FIG. 11 have been mounted.
Figure 13:
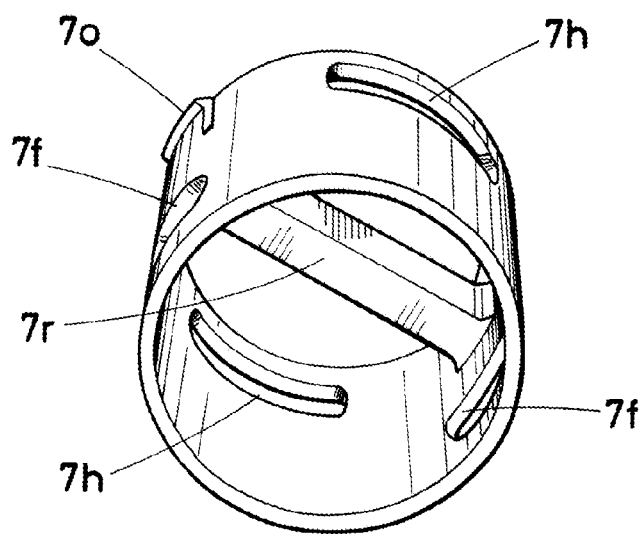
FIG. 13 is a bottom perspective view of the cylindrical housing shown in FIG. 12.
Figure 14:
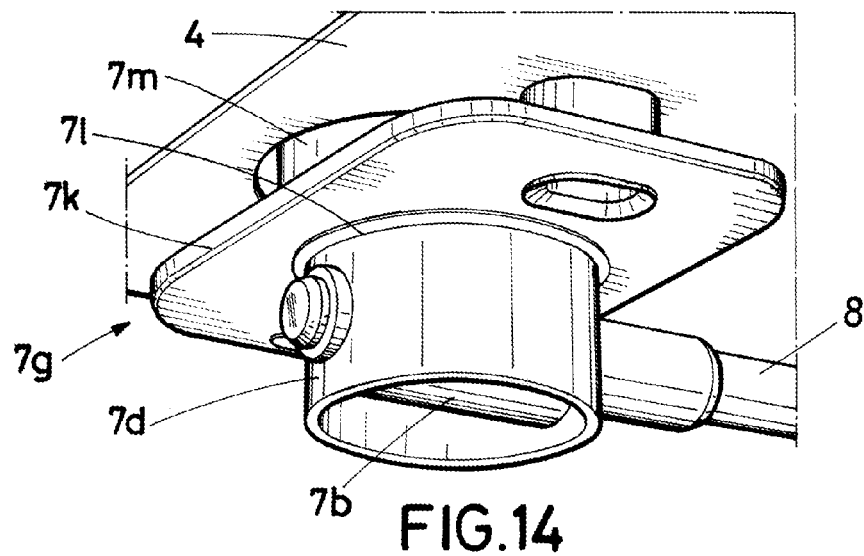
FIG. 14 is a bottom perspective view of arrangement shown in FIG. 12 pivotally clipped to a fixed foot member which is in turn affixed to a portion of the roof structure of the car body.

FIGS. 6 to 8 show an embodiment of the inner structure of the sunvisor body, according to which the sunvisor body -1- comprises an inner support board -12- made of a material such as technical plastic and which is sandwiched between above mentioned rear shell -1b- and front shell -1c-. The vanity mirror 2, an illumination system and an electric connection arrangement comprising connections paths -11e, 11f- are mounted to rear side portions of the inner support board -12-. Further, the inner support board -12-, comprises two sliding guides -12b, 12b'- by which the sunvisor body -1- is unrotatably and slidingly connected to the upper rod -8-, and a lateral frame structure -12a- laterally emerging from one side of the inner support board -12-. The first sliding guide -12b- emerges from an upper side portion of the inner support board -12- next to the detent member -7-, whilst the second sliding guide -12b'- emerges from an upper middle portion of the inner support board -12-.

The upper rod -8- comprises a cylindrical portion including the lateral end portion -8a- and a flattened portion. The sliding guides -12b, 12b'- are slidingly arranged on the flattened portion of the upper rod -8- and have inner channels that are shaped complementarily to the cross-sectional contour of the flattened portion. Thereby, tilting the sunvisor body -1- makes the upper rod -8- rotate in the detent member -7-.

A spiral spring -13- is wound tightly around a protruding portion of the first sliding guide -12b- located between the sliding guides -12b, 12b'-, to oppose a friction force acting against the sliding movement, to ensure that the sunvisor body is securely retained in the position elected by the user and to avoid accidental slipping during driving.

In the embodiment shown, the illumination system comprises a lighting member -9a-, particularly an LED device, and arranged within the sunvisor body -1- on the inner support board -12- to provide illumination to the vanity mirror 2, and a transparent light diffusing member -9b- is fixed e.g. glued between the vanity mirror 2 and the lighting member -9a-.

The illumination system is connected to a power output of the vehicle (not shown) by means of an electric connection arrangement which is provided with switching means including an actuator member -10- and designed to switch off electric power supply to the illumination system at least when the lid -3- is in its closed position, This electric connection arrangement comprises a first electric output contact -11a- and a second electric output contact -11b- which are both integrated in the hook member -5-, a first electric input contact -11c- and a second electric input contact -11d- located both on the rod shaped lateral extension -6- such that, when the rod shaped lateral extension -6- is held by the hook member -5-, the output contacts -11a, 11b- respectively contact the input contacts -11c, 11d- to provide the electric power supply to the illumination system. The electric input contacts -11c, 11d- are metal strips.

As shown in FIG. 7, the hook member -5- comprises a main body -5a- fastenable to the roof structure -4- and a hook portion -5b- for holding the rod shaped lateral extension -6- of the sunvisor body -1- the output contacts -11a, 11b- of which are mounted to the main body -5a- such that they contact the input contacts -11c, 11d-when the rod-shaped lateral extension -6- of the sunvisor body -1- is engaged in the hook member -5-.

On the inner support board -12- there are arranged, a first connection path -11e- connecting the first input contact -11c- and the lighting member -9a- and a second connection path -11f- that connects the second input contact -11d- with the lighting member -9a-. The connections paths -11e, 11f- are electrical blades affixed to the support board -12- (FIG. 6).

The lateral frame structure -12a- comprises a first arm member -12c-, a second arm member -12d-, and a connecting arm -12e-. The first arm member -12c- comprises the rod-shaped lateral extension -6- detachably engaged in the hook -5- and is axially aligned with the upper rod -8-. The second arm member -12d- is parallel to the first arm member -12c-, and connection arm -12e- connects the free ends of the first and second arms -12c, 12d-.

A portion of the first connection path -11e- that is adjacent to the first electric input contact -11c- extends towards the inner support board -12- within the first arm member -12c-, whilst a portion of the second connection path -11f- extends towards the support board -12- within the connection arm -12d- and the connection arm -12e-. This can be achieved, for instance, by overmolding techniques.

The second connection path -11f- comprises a first input path section -11g- having one end portion connected to the second input contact -11d- and an opposite free end portion -11h-, and a second input path section -11i- having an end portion connected to the lighting member -9a- and an opposite free end portion -11j- (FIG. 8).

The free end portion -11h- of the first input path section -11g- comprises an elastically flexible blade portion, whilst the free end portion -11j- of the second input path section -11i- is a fixed contact. The flexible blade portion overlaps the fixed contact at a distance when the lid -3- is the closed position, whilst, when the lid -3- is opened, an actuator member -10-, particularly an actuating portion of upper rim of the lid -3- pushes and presses the flexible blade portion against the fixed contact plate to close the electric circuit so the electric power is supplied to the illumination system.

Figure 17:
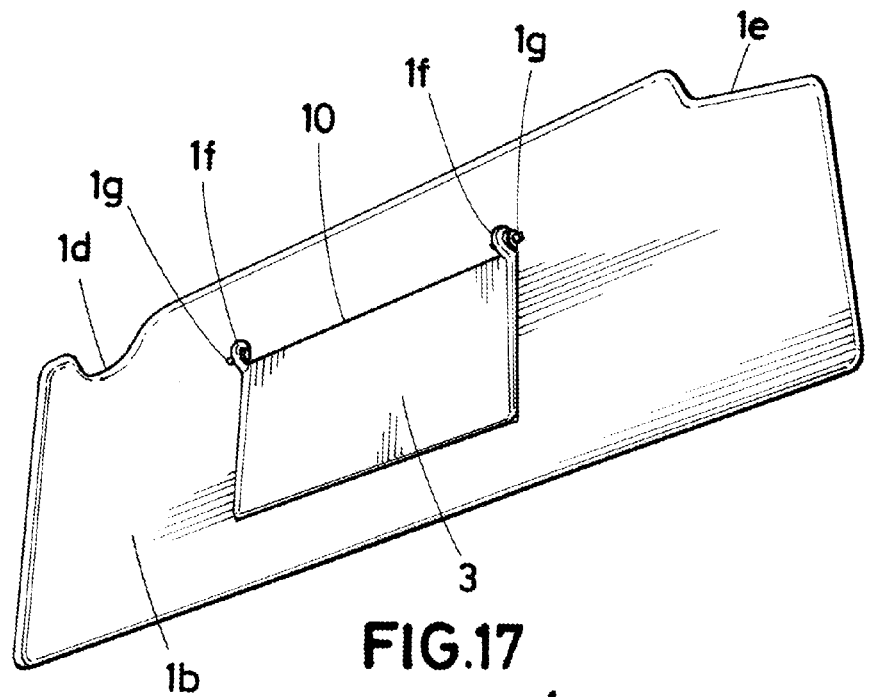
FIG. 17 is a front view of an embodiment of the rear shell of the sunvisor body shown in FIG. 2.
Figure 18:
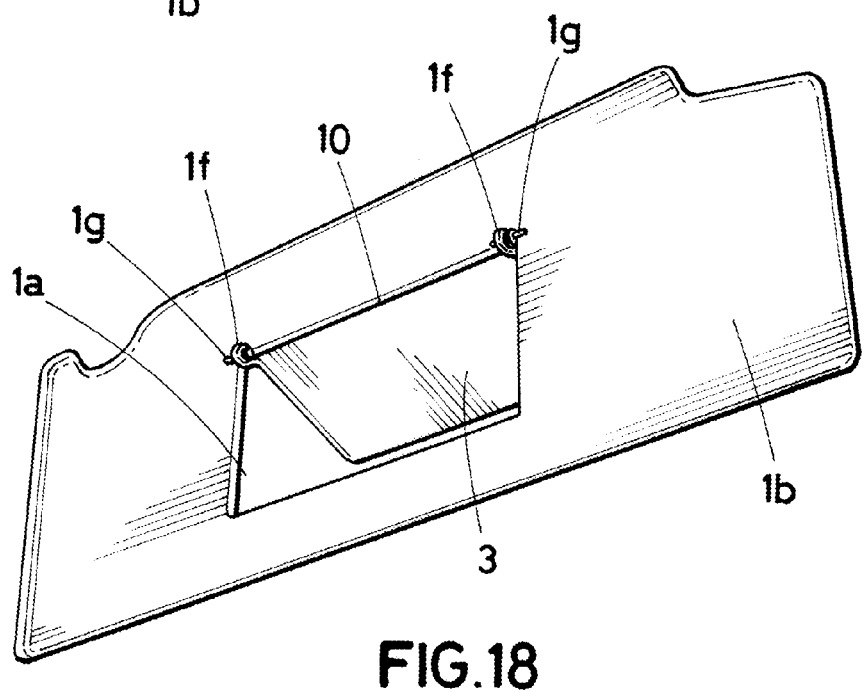
FIG. 18 shows the rear shell of FIG. 17 with its cover opened.

As apparent from FIGS. 17 and 18, the lid -3- is a lid hinged to the front portion of the rear shell -1b- of the sunvisor body -1-, and the lid is hinged to the sunvisor body -1- in such a manner that the rim portion is pressed against the flexible blade portion plate when the lid -3- is opened.

Particularly, the lid comprises two lateral rear projections -1f- each of which pivots about a hinge pin -1g- affixed to a front portion adjacent to opening -1a- in the rear shell -1b- (FIG. 17) In the assembled state of the sunvisor body -1-, the lateral rear portions are partially positioned in apertures -12f- in the inner support board -12- (FIG. 8). A resilient metal snap member -12g- protrudes from above into each aperture -12f-. The rear projections -1f- and the snap members -12g- are designed to retain the lid -3- respectively in it open and in its closed positions.

The invention claimed is:
1. A sunvisor with for a vehicle, comprising
a sunvisor body comprising a front surface and a rear surface;
a hinging arrangement for hinging the sunvisor body to a roof structure of a vehicle body such that the sunvisor body is tiltable about an upper horizontal axis between a first screening position where said front surface faces an upper portion of a windshield and an inoperative position where said rear surface is upwardly folded to face the roof structure, the hinging arrangement comprising a hook member located above an upper side portion of the sunvisor body and in which a rod-shaped lateral extension of the sunvisor body is detachably engaged when the sunvisor is in the first screening position and in said inoperative position, an upper rod unrotatably connected to the sunvisor body and comprising a lateral end portion that laterally protrudes from a side portion of the sunvisor body which is opposite to said rod-shaped lateral extension, and a detent member rotatably coupled to the upper rod and designed to selectively retain the sunvisor body in at least said first screening position and in said inoperative position;
a pivot means connected to the lateral end portion of the upper rod and fastened to the roof structure to swing the sunvisor body against a resistance exerted against pivoting by a braking arrangement, between the first screening position where the sunvisor body is hooked in the hook member to a second screening position where the rear surface of the sunvisor body is adjacent to an upper portion of a side window;
wherein
the detent member is coupled to the lateral end portion of the rod and located outside the sunvisor body, and the pivot means is integrated in the detent member,
and wherein:
the lateral end portion of the rod comprises an engagement portion;
the detent member comprises a detent clip comprising an enveloping portion and two wing portions emerging from the enveloping portion, and a housing with an inner hollow for accommodating the detent clip;
the enveloping portion tightly embraces a peripheral portion of the engagement portion;
the housing is pivotally coupled to a foot member that is fixedly fastenable to the roof structure;
the housing comprises two axially-opposed throughholes for rotatably bearing the engagement portion, and retaining means to which the wing portions of the detent clip are coupled;
the engagement portion and the enveloping portion are rotatably coupled to each other in such a manner that a friction torque is opposed against rotation of the rod when the sunvisor body is tilted between said first screening position and said inoperative position;
the foot member comprises a base plate with a circular opening and a cylindrical upper body portion comprising a cylindrical hollow which is aligned with the circular opening to form a cylindrical passage;
at least an upper portion of the housing has a cylindrical shape dimensioned to fit snugly and pivotally within said cylindrical passage;
the housing comprises an upper base provided with at least two clipping members which are slidably retained on an upper rim portion of the cylindrical upper body portion of the foot member; and said braking arrangement comprises a spiral spring member, with two edges tightly fixed to the foot member and wound around a peripheral portion of the cylindrical upper body portion of the foot member, such that a friction torque between the detent member and the spiral spring member must be overcome to pivot the sunvisor body from said first screening position to said second screening position.

2. A sunvisor according to claim 1, wherein
the lateral end portion of the rod has a cylindrical shape and comprises a free end and the engagement portion comprises a recessed flat area.

3. A sunvisor according to claim 2, wherein
the engagement portion is overmolded with a sleeve member of a technical plastic material having an elevate toughness;
the sleeve member comprises a further recessed flat area located over at least a portion of the recessed flat area on the lateral end portion of the rod;
the enveloping portion of the clip tightly embraces the peripheral portion of the engagement portion via the sleeve member.

4. A sunvisor according to claim 1, wherein the retaining means to which the wing portions of the detent clip are coupled, comprise
a central crossbar arranged within an upper portion of the inner hollow of the housing above and parallel to the lateral end portion of the rod;
locking elements for locking upper portions of the wing portions to the crossbar.

5. A sunvisor according to claim 1, wherein the sunvisor body is connected to the upper rod such that, at least when the lateral extension is unhooked from the hook member it is axially slidable on the upper rod between a nearer position where the sunvisor body is closest to the detent member and a farther position where the sunvisor body is most distanced from the detent member.

6. A sunvisor according to claim 1, further comprising
a vanity mirror mounted behind said rear surface of the sunvisor body, the rear surface comprising an opening through which the vanity mirror is at least partially visible;
a cover mounted to the sunvisor body, the cover being movable between a closed position where it covers said opening in the rear surface of the sunvisor body and an opened position where it does not cover said opening;
an illumination system comprising at least one lighting member arranged within the sunvisor body to provide illumination to the vanity mirror, and connected to a power output of the vehicle by means of an electric connection arrangement which comprises switching means comprising an actuator member and designed to switch off electric power supply to the illumination system at least when said cover is in its closed position,
and in that the electric connection arrangement further comprises a first electric output contact and a second electric output contact integrated in the hook member, a first electric input contact and a second electric input contact located both on said rod shaped lateral extension such that, when the rod shaped lateral extension is held by said hook member, said output contacts respectively contact said input contacts to provide the electric power supply to the illumination system.

7. A sunvisor according to claim 6, wherein
the electric connection arrangement comprises a first connection path connecting said first input contact and said lighting member and a second connection path connecting said second input contact with said lighting member;

the switching means are operatively interconnected in at least one of the connections paths between the input contact and the lighting member;

at least one of the first and second connection paths comprises a first input path section having one end portion connected to the second input contact and an opposite free end portion, and a second input path section having an end portion connected to the lighting member and an opposite free end portion;

one free end portion is a fixed contact and the other free end portion is a moving contact;

the actuator member is an actuating portion of the cover designed to push said moving contact against said fixed contact when the cover is opened.

8. A sunvisor according to claim 7, wherein at least one of the first and second connection paths is at least partially comprised of an electrical blade affixed to the support board.

9. A sunvisor according to claim 6, wherein the cover is a tiltable lid hinged to the sun visor body.

10. A sun visor according to claim 6, wherein the cover is a sliding lid which is slidingly arranged in the sunvisor body.

11. A sunvisor according to claim 6, wherein the hook member comprises a main body fastenable to the roof structure and a hook portion for holding the rod shaped lateral extension of the sunvisor body;

said electric input contacts are metal strips;

said output contacts are mounted to the main body such that they contact the metal strips when the rod-shaped lateral extension of the sunvisor body is held in the hook member.

12. A sunvisor according to claim 11, wherein said output contacts are mounted to the main body in a resiliently retractile manner.

* * * * *